United States Patent
Lee et al.

(10) Patent No.: US 10,601,067 B2
(45) Date of Patent: Mar. 24, 2020

(54) NEGATIVE ELECTRODE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Jin-Hyon Lee, Yongin-si (KR); Sang-In Park, Yongin-si (KR); Ji-Woon Lee, Yongin-si (KR); Eun-Young Goh, Yongin-si (KR); Jong-Ki Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 511 days.

(21) Appl. No.: 14/872,737

(22) Filed: Oct. 1, 2015

(65) Prior Publication Data
US 2016/0133926 A1     May 12, 2016

(30) Foreign Application Priority Data
Nov. 11, 2014   (KR) .......................... 10-2014-0156430

(51) Int. Cl.
*H01M 4/48* (2010.01)
*H01M 4/50* (2010.01)
(Continued)

(52) U.S. Cl.
CPC ......... *H01M 10/052* (2013.01); *H01M 4/133* (2013.01); *H01M 4/366* (2013.01);
(Continued)

(58) Field of Classification Search
CPC ........ H01M 10/052; H01M 4/48; H01M 4/50; H01M 4/587; H01M 4/133; H01M 4/62
See application file for complete search history.

(56) References Cited

U.S. PATENT DOCUMENTS

2006/0246356 A1\*  11/2006  Abe ...................... H01M 4/587
                                                                        429/326
2007/0298322 A1\*  12/2007  Yamamoto ............ H01M 4/628
                                                                        429/218.1
(Continued)

FOREIGN PATENT DOCUMENTS

JP        2014-022041 A    2/2014
KR   10-2001-0096073 A    11/2001
(Continued)

OTHER PUBLICATIONS

"Equivalent Conductivity of Caboxymethylcellulose Aqueous Solutions with Divalent Counterions", Bordi et al., J. Phys. Chem. 90, p. 3034-3038, 1986.\*

*Primary Examiner* — Kenneth J Douyette
(74) *Attorney, Agent, or Firm* — Knobbe, Martens, Olson & Bear LLP (57) ABSTRACT

Provided are a negative electrode for a rechargeable lithium battery including a negative active material and a conductive material wherein the negative active material includes graphite and an inorganic particle positioned on the surface of the graphite and having no reactivity with lithium, and the conductive material is included in an amount of greater than or equal to about 0.1 wt % and less than about 2 wt % based on the total amount of the negative active material and the conductive material, and a rechargeable lithium battery including the same.

18 Claims, 8 Drawing Sheets

- Inorganic particle
- Inorganic particle solvated with electrolyte (51) Int. Cl.
  *H01M 10/052* (2010.01)
  *H01M 4/62* (2006.01)
  *H01M 4/36* (2006.01)
  *H01M 4/133* (2010.01)
  *H01M 4/02* (2006.01)

(52) U.S. Cl.
  CPC ............ *H01M 4/62* (2013.01); *H01M 4/624* (2013.01); *H01M 2004/021* (2013.01)

(56) References Cited

U.S. PATENT DOCUMENTS

| | | | | |
|---|---|---|---|---|
| 2009/0274960 | A1* | 11/2009 | Yokouchi | H01M 4/133 429/231.8 |
| 2010/0159314 | A1* | 6/2010 | Kim | H01M 2/1673 429/120 |
| 2011/0027646 | A1 | 2/2011 | Lee et al. | |
| 2011/0244322 | A1* | 10/2011 | Hong | H01M 4/364 429/211 |
| 2012/0070736 | A1* | 3/2012 | Ohara | H01M 4/13 429/211 |
| 2013/0017438 | A1* | 1/2013 | Taguchi | H01G 11/06 429/179 |
| 2013/0071741 | A1* | 3/2013 | Ohara | H01M 4/62 429/212 |

FOREIGN PATENT DOCUMENTS

| | | |
|---|---|---|
| KR | 10-2008-0112977 A | 12/2008 |
| KR | 10-2010-0118809 A | 11/2010 |

\* cited by examiner

NEGATIVE ELECTRODE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2014-0156430 filed in the Korean Intellectual Property Office on Nov. 11, 2014, the entire contents of which are incorporated herein by reference.

BACKGROUND

Field

A negative electrode for a rechargeable lithium battery and a rechargeable lithium battery including the same are disclosed.

Description of the Related Art

Lithium rechargeable batteries have recently drawn attention as a power source for small portable electronic devices. Lithium rechargeable batteries use an organic electrolyte solution and thereby, have twice or more as high a discharge voltage than a conventional battery using an alkali aqueous solution and accordingly, high energy density.

Such a rechargeable lithium battery is generally manufactured by injecting an electrolyte solution into an electrode assembly, which includes a positive electrode including a positive active material capable of intercalating/deintercalating lithium ions and a negative electrode including a negative active material capable of intercalating/deintercalating lithium ions.

As for the negative active material, various graphite-based materials such as artificial graphite, natural graphite and the like have been used.

When the graphite-based negative active material is applied to realize a high-capacity rechargeable lithium battery, an active material layer is in general formed to have greater than or equal to about 30 mg/cm$^2$ of a weight per unit area on both sides of a current collector, and a negative electrode is also compressed to have active mass density of greater than or equal to 1.70 g/cc.

However, lithium ions have difficulties in moving in the electrode and change a lithiated state in the electrode, failing in realizing designed capacity of the rechargeable lithium battery and causing a problem in terms of power and cycle-life characteristics.

SUMMARY

One embodiment relates to a negative electrode for a rechargeable lithium battery having high capacity and excellent cycle-life characteristics and rate capability by improving electrolyte impregnation property in a thick film electrode.

Another embodiment relates to a rechargeable lithium battery including the negative electrode for a rechargeable lithium battery.

One embodiment relates to a negative electrode for a rechargeable lithium battery that includes a negative active material and a conductive material, wherein the negative active material includes graphite and an inorganic particle positioned on the surface of the graphite and having no reactivity with lithium, and the conductive material is included in an amount of greater than or equal to about 0.1 wt % and less than about 2 wt % based on the total amount of the negative active material and the conductive material.

The inorganic particle may include a metal oxide, a metal hydrate, or a combination thereof, and specifically the inorganic particle may include $Al_2O_3$, $Ce_2O_3$, $TiO_2$, $AlO(OH)$, $ZnO_2$, $ZrO_2$, $HfO_2$, $MnO_2$, $MgO$, $WO_2$, $V_2O_5$, or a combination thereof.

The inorganic particle may be attached on the surface of the graphite in a form of an island.

The inorganic particle may have a particle diameter of greater than or equal to about 50 nm and less than about 2 μm.

The inorganic particle may be included in an amount of about 0.2 parts by weight to about 2 parts by weight based on 100 parts by weight of the graphite.

The negative electrode may have an active mass density of greater than or equal to about 1.65 g/cc.

Another embodiment relates to a rechargeable lithium battery including the negative electrode.

Other embodiments are included in the following detailed description.

A rechargeable lithium battery having high-capacity and excellent cycle-life characteristics and rate capability may be realized by improving electrolyte impregnation property in a thick film electrode.

DETAILED DESCRIPTION

Hereinafter, embodiments are described in detail. However, these embodiments are examples, and this disclosure is not limited thereto.

Hereinafter, a negative electrode for a rechargeable lithium battery according to one embodiment is described.

The negative electrode for a rechargeable lithium battery according to the present embodiment includes a current collector and a negative active material layer formed on the current collector. The negative active material layer includes a negative active material and a conductive material, and the negative active material includes graphite and an inorganic particle positioned on the surface of the graphite.

The negative electrode for a rechargeable lithium battery may be formed in a thick film. Furthermore, the negative electrode for a rechargeable lithium battery may have high active mass density. Specifically, the negative electrode may be formed to have a high active mass density of greater than or equal to about 1.65 g/cc, for example, an active mass density of from about 1.65 g/cc to about 1.75 g/cc. Furthermore, the negative electrode may be formed to have a high active mass density of greater than or equal to about 1.70 g/cc. When a negative electrode having an active mass density within the range is applied to a rechargeable lithium battery, a high-capacity battery may be realized.

In general, a solvent and a lithium salt consisting of an electrolyte and the fine structure of a negative active material and an electrode have an influence on mobility of lithium ions, and herein, when graphite is used as the negative active material, the graphite is hydrophobic while the solvent in the electrolyte is hydrophilic, and thus, the electrolyte may not easily be impregnated into the negative active material. In particular, when an electrode has an increased weight per unit area or an increased active mass density, a movement passage for lithium ions may become extremely longer and thus, largely change distribution of the lithium ions in the electrode. According to one embodiment, a negative electrode having a high active mass density is formed by using a negative active material using an inorganic particle positioned on the surface of graphite to improve impregnation property of an electrolyte.

Figure 1:
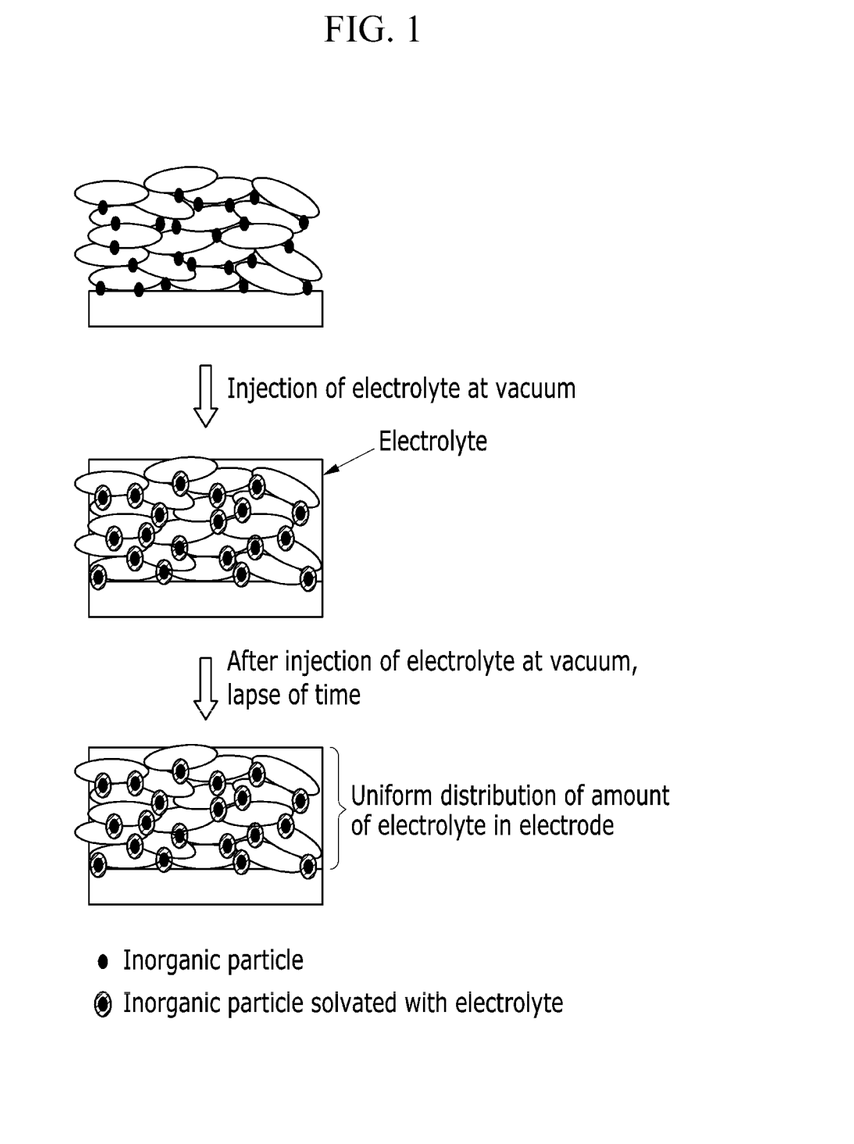
FIG. 1 is a schematic view showing a structure of a negative electrode for a rechargeable lithium battery according to one embodiment.

This impregnation property of an electrolyte is specifically illustrated referring to FIG. 1.

FIG. 1 is a schematic view showing a structure of a negative electrode for a rechargeable lithium battery according to one embodiment.

Referring to FIG. 1, when an electrolyte is vacuum-injected into a negative electrode formed by adding the inorganic particle, the electrolyte is infiltrated into a pore formed in an electrode due to packing of graphite, and simultaneously, the inorganic particle is hydrophilic and thus, becomes wet by the electrolyte and solvated. Accordingly, the electrolyte is uniformly distributed overall the electrode after the vacuum injection of the electrolyte because of the solvated inorganic particle and thus, improve impregnation property of the electrolyte into the negative electrode.

Accordingly, a negative active material including the hydrophilic inorganic particle on the surface of graphite improves transportation characteristics of lithium ions in a thick film electrode having a high active mass density and may realize a rechargeable lithium battery having excellent rate capability and cycle-life characteristics.

Specifically, the inorganic particle may be attached to the surface of the graphite, for example, on the surface of the graphite in a form of an island. The island form indicates that the inorganic particle is attached not on the entire surface of the graphite but a part of the surface thereof, that is, discontinuously attached. The inorganic particle may be attached on the surface of the graphite in a method of coating and the like. When the inorganic particle is attached on the surface of the graphite in a form of an island, more uniform dispersion in the negative electrode may be achieved, and thus, impregnation property of the electrolyte may be improved.

The graphite may include natural graphite, artificial graphite or a combination thereof.

The inorganic particle has no reactivity with lithium and thus, is distinguished from a material used as a negative active material capable of intercalating and deintercalating lithium. Specifically, the inorganic particle may be a hydrophilic material such as a metal oxide, a metal hydrate, or a combination thereof, and more specifically $Al_2O_3$, $Ce_2O_3$, $TiO_2$, $AlO(OH)$, $ZnO_2$, $ZrO_2$, $HfO_2$, $MnO_2$, $MgO$, $WO_2$, $V_2O_5$ or a combination thereof.

The inorganic particle may have a particle diameter of greater than or equal to about 50 nm and less than about 2 µm, for example greater than or equal to about 300 nm and less than about 2 µm, or about 400 nm to about 1 µm. An inorganic particle having a particle diameter within the range has a high specific surface area and thus, may further improve impregnation property of an electrolyte.

The inorganic particle may be included in an amount of about 0.2 parts by weight to about 2 parts by weight, for example about 0.5 parts by weight to about 1 part by weight based on 100 parts by weight of the graphite. When the inorganic particle is used within the range, the inorganic particle may be uniformly dispersed in a negative electrode and thus, increase impregnation of an electrolyte and suppress electric resistance increase of the negative electrode.

The inorganic particle is mixed with the graphite to prepare a negative active material in a dry-coating method, through which the inorganic particle is coated in a form of an island on the surface of the graphite by using a processing unit, such as a Nobilta™ (Cheshire, England) device at a rotation speed of about 1000 rpm to 5000 rpm for about 5 minutes to 30 minutes.

If an active material, an inorganic particle, and a conductive material are simultaneously mixed to prepare an active material slurry, the conductive material may be presented on the surface of the inorganic particle, so that the conductive material may be existed between the active material and the inorganic particle.

However, in the present invention, graphite is first mixed with an inorganic particle to present the inorganic particle on the surface of the graphite in the form of an island type, and thus the conductive material cannot be exist between the graphite and the inorganic particle.

The inorganic particle is included in the negative active material and thus, may improve impregnation property of an electrolyte but has a small size and may cause a dispersion problem in a negative electrode and also, decrease electron conductivity of the negative electrode and resultantly, increase resistance of the negative electrode. Accordingly, one embodiment uses a conductive material as well as the inorganic particle and thus, may decrease electric resistance of the negative electrode and thus, improve rate capability of a battery.

The conductive material may be included in an amount of greater than or equal to about 0.1 wt % and less than about 2 wt %, for example, about 0.5 wt % to about 1 wt % based on the total amount of the negative active material and the conductive material. When the conductive material is included within the above range, the conductive material may decrease electric resistance of the negative electrode but not block a pore among negative active material particles and thus, improve impregnation property of an electrolyte.

The conductive material may be a carbon-based material such as natural graphite, artificial graphite, carbon black, acetylene black, ketjen black, carbon fiber and the like; a metal-based material such as a metal powder or a metal fiber and the like of copper, nickel, aluminum, silver, and the like; a conductive polymer such as a polyphenylene derivative and the like; or a mixture thereof.

The negative active material layer may further include a binder as well as the negative active material and the conductive material.

The binder improves binding properties of the negative active material particles with one another and with a current collector Examples of the binder may be a non-water-soluble binder, a water-soluble binder, or a combination thereof.

In some embodiments, the non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

In some embodiments, the water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth) acrylic acid and (meth)acrylic acid alkyl ester, or a combination thereof.

When the water-soluble binder is used as a negative electrode binder, a cellulose-based compound may be further used to provide viscosity. In some embodiments, the cellulose-based compound includes one or more of carboxylmethyl cellulose, hydroxypropylmethyl cellulose, methyl cellulose, or alkali metal salts thereof. In some embodiments, the alkali metal may be Na, K, or Li. Such a thickener may be included in an amount of about 0.1 parts by weight to about 3 parts by weight based on 100 parts by weight of the negative active material.

The current collector may use copper, but is not limited thereto.

The negative electrode may be manufactured by a method including mixing the negative active material and the conductive material and optionally the binder in a solvent such as N-methyl pyrrolidone or water to prepare a composition, and coating the composition on the current collector, followed by drying and compressing the same. Herein, the compression process may be performed to obtain an active mass density of greater than or equal to about 1.65 g/cc, for example, an active mass density of from about 1.65 g/cc to about 1.75 g/cc. The solvent may be N-methylpyrrolidone, and the like, but is not limited thereto. The electrode manufacturing method is well known, and thus is not described in detail in the present specification.

Hereinafter, a rechargeable lithium battery including the negative electrode is described referring to FIG. 2.

Figure 2:
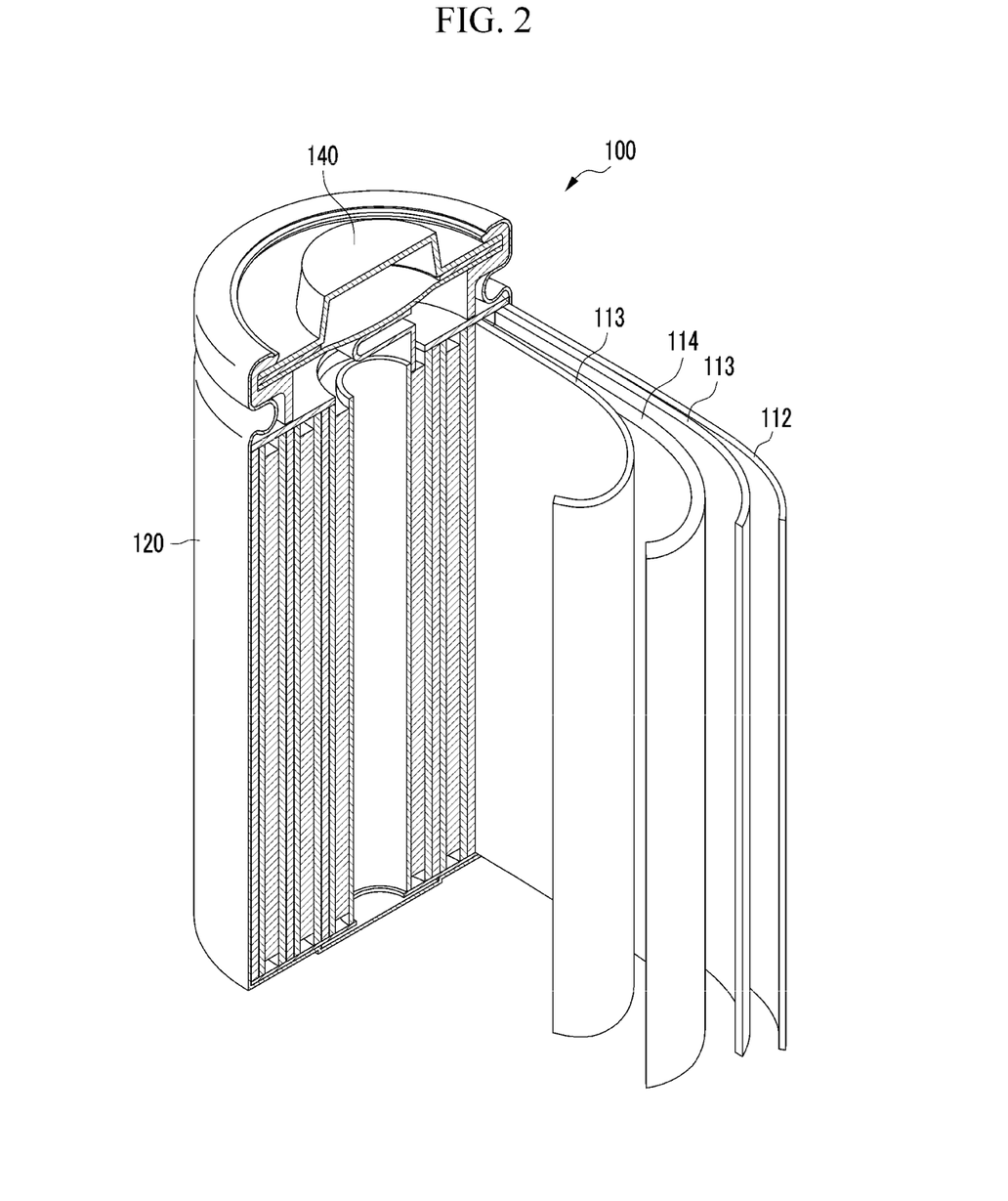
FIG. 2 is a schematic view of a rechargeable lithium battery according to one embodiment.

FIG. 2 is a schematic view of a rechargeable lithium battery according to one embodiment.

Referring to FIG. 2, a rechargeable lithium battery 100 according to one embodiment includes an electrode assembly including a positive electrode 114, a negative electrode 112 facing the positive electrode 114, a separator 113 disposed between the positive electrode 114 and the negative electrode 112, and an electrolyte (not shown) impregnated in the positive electrode 114, the negative electrode 112, and the separator 113, a battery case 120 housing the electrode assembly, and a sealing member 140 sealing the battery case 120.

The rechargeable lithium battery according to one embodiment is not limited to the shape of FIG. 2, and it may be formed in diverse shapes such as a cylindrical, prismatic, coin-type form, or pouch shape as long as it includes the negative electrode for a rechargeable lithium battery and operates as a battery.

The negative electrode 112 is the same as described above.

The positive electrode 114 includes a current collector and a positive active material layer formed on the current collector.

The positive active material layer includes a positive active material, and the positive active material may include lithiated intercalation compounds that reversibly intercalate and deintercalate lithium ions. Specifically the positive active material may include an oxide of at least one metal selected from cobalt, manganese, nickel, and aluminum, and lithium. More specifically, the compounds represented by one of the following chemical formulae may be used. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ in the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since it is well-known to those who work in the related field.

The positive active material layer may include a binder, a conductive material, and the like.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material provides an electrode with conductivity. Any electrically conductive material may be used as a conductive material unless it causes a chemical change. Examples thereof include a carbon-based material such as natural graphite, artificial graphite, carbon black, acetylene black, ketjen black, a carbon fiber and the like; a metal-based material such as a metal powder or a metal fiber and the like of copper, nickel, aluminum, silver, and the like; a conductive polymer such as a polyphenylene derivative and the like; or a mixture thereof.

The current collector may use Al, and the like, but is not limited thereto.

The positive electrode may be manufactured by a method including mixing the positive active material, the conductive material and the binder in a solvent to prepare an active material composition, and coating the composition on a current collector followed by drying and compressing the same. The solvent includes N-methylpyrrolidone and the like, but is not limited thereto. The electrode manufacturing method is well known, and thus is not described in detail in the present specification.

The electrolyte includes a non-aqueous organic solvent and a lithium salt.

The non-aqueous organic solvent serves as a medium for transmitting ions taking part in the electrochemical reaction of a battery. The non-aqueous organic solvent may include a carbonate-based, ester-based, ether-based, ketone-based, alcohol-based, or aprotic solvent.

The carbonate-based solvent may include, for example dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like.

Particularly, when a linear carbonate compound and a cyclic carbonate compound are mixed, a solvent having a high dielectric constant and a low viscosity may be provided. Particularly, when a linear carbonate compound and a cyclic carbonate compound are mixed, a solvent having a high dielectric constant and a low viscosity may be provided.

The ester-based solvent may include, for example methylacetate, ethylacetate, n-propylacetate, dimethylacetate, methylpropionate, ethylpropionate, γ-butyrolactone, decanolide, valerolactone, mevalonolactone, caprolactone, and the like. The ether-based solvent may include, for example dibutylether, tetraglyme, diglyme, dimethoxyethane, 2-methyltetrahydrofuran, tetrahydrofuran, and the like, and the ketone-based solvent may include cyclohexanone, and the like. The alcohol-based solvent may include ethyl alcohol, isopropyl alcohol, and the like.

The non-aqueous organic solvent may be used singularly or in a mixture, and when the organic solvent is used in a mixture, the mixture ratio may be controlled in accordance with a desirable battery performance.

The electrolyte may further include an overcharge inhibitor additive such as ethylenecarbonate, pyrocarbonate, or the like.

The lithium salt is dissolved in an organic solvent, supplies lithium ions in a battery, basically operates the rechargeable lithium battery, and improves lithium ion transportation between positive and negative electrodes therein.

Specific examples of the lithium salt may be $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN$ $LiN(C_xF_{2x+1}SO_2)(C_yF_{2y+1}SO_2)$, wherein, x and y are natural numbers, e.g. an integer of 1 to 20, LiCl, LiI, $LiB(C_2O_4)_2$ (lithium bis(oxalato) borate, LiBOB), or a combination thereof.

The lithium salt may be used in a concentration of from about 0.1 M to about 2.0 M. When the lithium salt is included within the above concentration range, an electrolyte may have excellent performance and lithium ion mobility due to optimal conductivity and viscosity.

The separator 113 may include any materials commonly used in the conventional lithium battery as long as separating a negative electrode from a positive electrode and providing a transporting passage for lithium ions. In other words, the separator may be made of a material having a low resistance to ion transportation and an improved impregnation for an electrolyte. For example, the material may be selected from glass fiber, polyester, polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

Hereinafter, the embodiments are illustrated in more detail with reference to examples. However, these are examples, and the present disclosure is not limited thereto.

Manufacture of Negative Electrode for Rechargeable Lithium Battery

Example 1

A negative active material was prepared by mixing graphite and 0.5 parts by weight of AlO(OH) having 0.4 μm of a particle diameter based on 100 parts by weight of the graphite and dry-coating inorganic particles on the surface of the graphite to form an island shape at a rotation speed of 3000 rpm for 15 minutes with a Nobilta™ equipment.

97 wt % of the negative active material, 1 wt % of carboxylmethyl cellulose (CMC), 1 wt % of a styrene-butadiene rubber (SBR) and 1 wt % of carbon black were dispersed into water, preparing slurry. The slurry was coated on a Cu foil current collector, dried and compressed, manufacturing a negative electrode having 1.75 g/cc of active mass density.

Example 2

A negative electrode was manufactured according to the same method as Example 1 except for using 96.05 wt % of a negative active material and 1.95 wt % of carbon black during the manufacture of the negative Electrode.

Reference Example 1

A negative electrode was manufactured according to the same method as Example 1 except for using $Al_2O_3$ having 2 μm of a particle diameter instead of the AlO(OH) in Example 1.

Comparative Example 1

98 wt % of graphite, 1 wt % of carboxylmethyl cellulose (CMC) and 1 wt % of a styrene-butadiene rubber (SBR)

were mixed in water, preparing slurry. The slurry was coated on a Cu foil current collector and then, dried and compressed, manufacturing a negative electrode having 1.75 g/cc of active mass density.

Comparative Example 2

97 wt % of negative active material obtained by mixing graphite and 0.5 parts by weight of $Al_2O_3$ having 0.4 μm of a particle diameter based on 100 parts by weight of the graphite, 1 wt % of carboxylmethyl cellulose (CMC), 1 wt % of a styrene-butadiene rubber (SBR) and 1 wt % of carbon black were dispersed into water, preparing slurry. The slurry was coated on a Cu foil current collector and then, dried and compressed, manufacturing a negative electrode having 1.75 g/cc of active mass density.

Comparative Example 3

98 wt % of the negative active material according to Example 1, 1 wt % of carboxylmethyl cellulose (CMC) and 1 wt % of a styrene-butadiene rubber (SBR) were dispersed into water, preparing slurry. The slurry was coated on a Cu foil current collector and then, dried and compressed, manufacturing a negative electrode having 1.75 g/cc of active mass density.

COMPARATIVE EXAMPLE 4

A negative electrode was manufactured according to the same method as Example 1 except for using 96 wt % of the negative active material and 2 wt % of carbon black during manufacture of the negative electrode.

Manufacture of Rechargeable Lithium Battery Cell

A positive electrode was manufactured by dispersing $LiCoO_2$, polyvinylidene fluoride (PVDF) and carbon black in a weight ratio of 96:2:2 into an N-methylpyrrolidone (NMP) solvent to prepare slurry and then, coating the slurry on an Al current collector and then, drying and compressing it.

A separator formed of a polyethylene material was disposed between the positive electrode and each negative electrode according to Examples 1 and 2, Reference Example 1 and Comparative Examples 1 to 4, a product therefrom was injected into a battery case, and electrolyte solution was injected thereinto, manufacturing a rechargeable lithium battery cell. Herein, the electrolyte solution was prepared by mixing ethylenecarbonate (EC), diethylcarbonate (DEC) and fluoroethylenecarbonate (FEC) in a volume ratio of 5:70:25 and dissolving 1.15 M $LiPF_6$ in the mixed solution.

Evaluation 1: Impregnation Property of Electrolyte Solution

Figure 3:
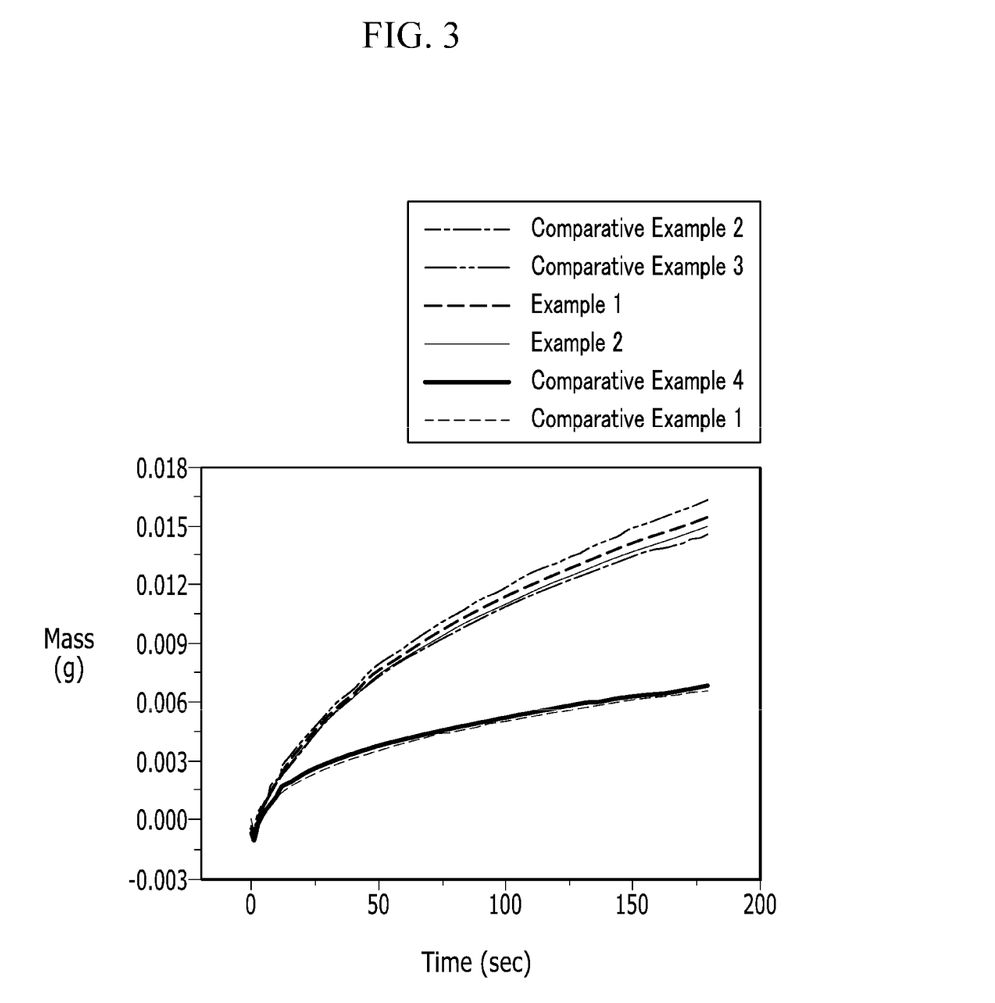
FIG. 3 is a graph showing electrolyte solution impregnation properties of negative electrodes according to Examples 1 and 2 and Comparative Examples 1 to 4.
Figure 4:
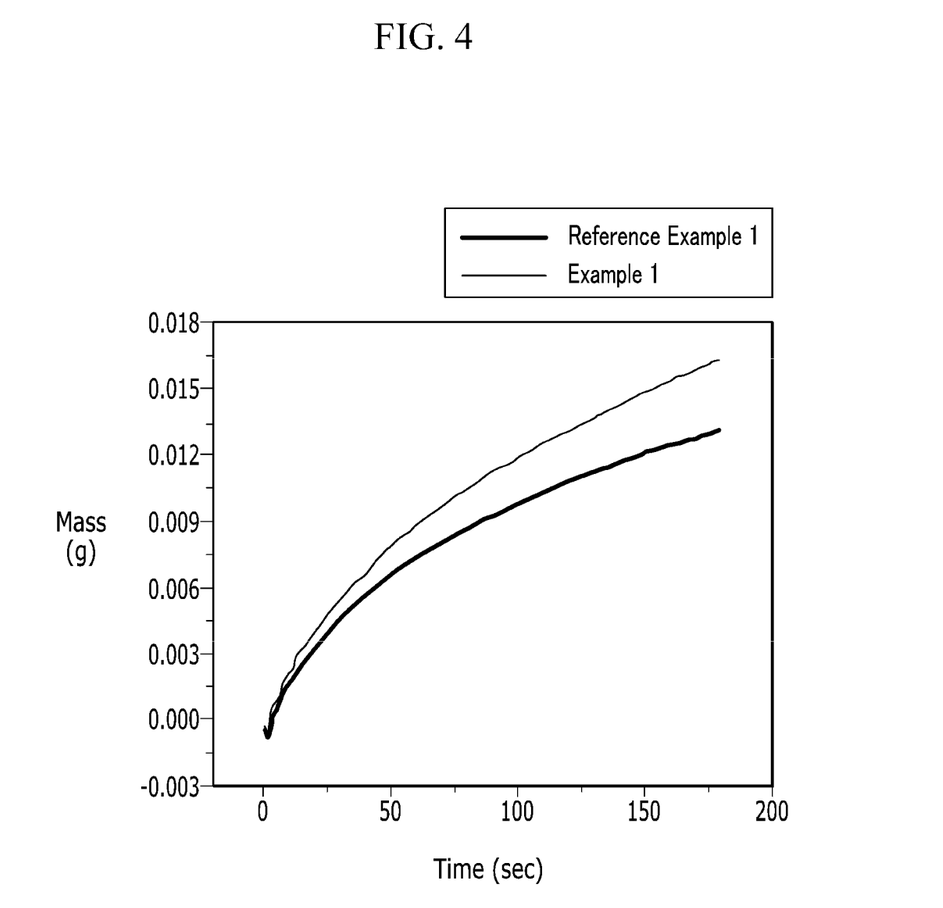
FIG. 4 is a graph showing electrolyte solution impregnation properties of the negative electrodes for a rechargeable lithium battery according to Example 1 and Reference Example 1.

Impregnation characteristics of the electrolyte solution about the negative electrodes for a rechargeable lithium battery according to Examples 1 and 2, Reference Example 1 and Comparative Examples 1 to 4 were evaluated by cutting the electrode into a size of 2 cm×2 cm, dipping it in the electrolyte solution, and then, measuring the amount of the electrolyte solution impregnated into the electrode, and the results are provided in FIGS. 3 and 4.

FIG. 3 is a graph showing electrolyte solution impregnation properties of the negative electrodes for a rechargeable lithium battery according to Examples 1 and 2 and Comparative Examples 1 to 4.

Referring to FIG. 3, the negative electrodes of Examples 1 and 2 including the negative active material having an inorganic particle on the surface of graphite and the conductive material within a predetermined range showed excellent impregnation property of the electrolyte solution.

The negative electrode of Comparative Example 2 in which graphite and an inorganic particle were simply blended showed deteriorated impregnation property of an electrolyte solution compared with the negative electrodes of Examples 1 and 2. In addition, the negative electrode of Comparative Example 1 using no inorganic particle showed largely deteriorated impregnation property of an electrolyte solution. Furthermore, the negative electrode of Comparative Example 4 using a negative active material including an inorganic particle on the surface of graphite along with a conductive material but also using the conductive material in an amount of 2 wt % showed largely deteriorated impregnation property of an electrolyte solution.

The negative electrode of Comparative Example 3 using a negative active material including an inorganic particle on the surface of graphite but no conductive material showed excellent electrolyte solution impregnation property but high electric resistance and thus, largely deteriorated rate capability as described in below and resultantly, may not be applied to a rechargeable lithium battery cell according to one embodiment.

FIG. 4 is a graph showing electrolyte solution impregnation property of the negative electrodes for a rechargeable lithium battery according to Example 1 and Reference Example 1.

Referring to FIG. 4, the electrolyte solution impregnation property was deteriorated, as a larger inorganic particle brought about a smaller specific surface area.

Evaluation 2: Electric Resistance

Electric resistance characteristics of the negative electrodes for a rechargeable lithium battery according to Examples 1 and 2 and Comparative Examples 1 to 4 were evaluated in the following method, and the results are provided in FIG. 5. After punching the electrode into a circle having a size of 20 φ, resistance of the electrode was calculated by applying a voltage of 1 V of 1 kHz to the electrode and measuring a current value with an electrical conductivity-measuring equipment using a two point probe. The resistance of the electrode was converted into specific resistance by measuring the area and thickness of the electrode.

Figure 5:
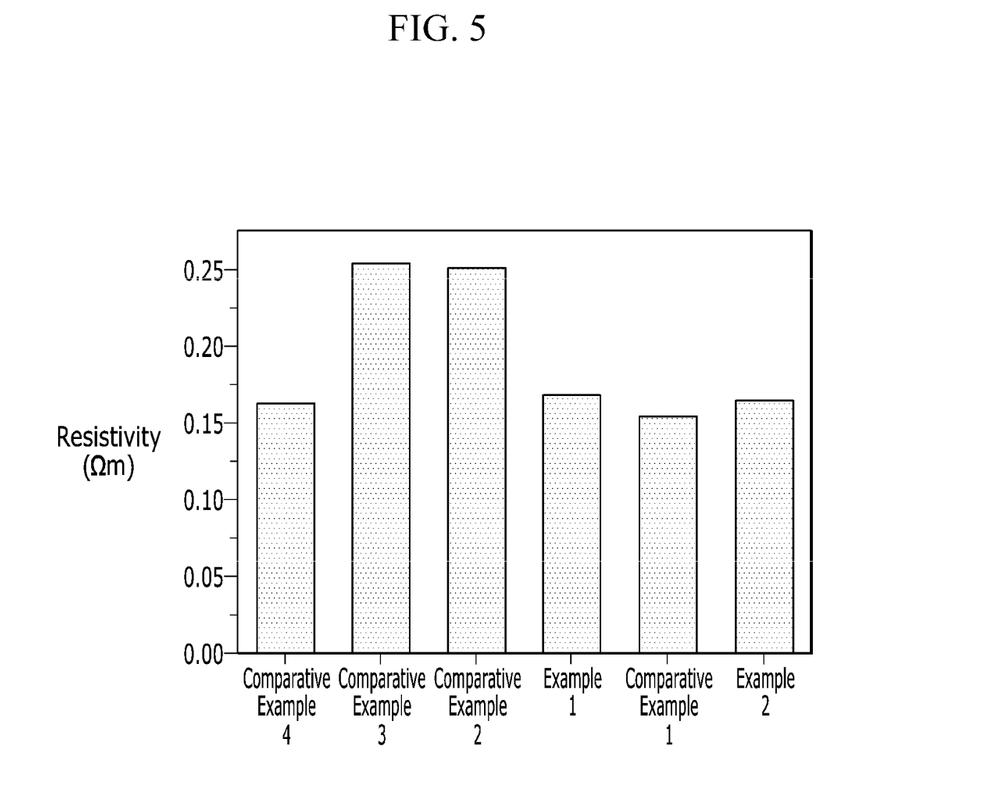
FIG. 5 is a graph showing resistance characteristics of the negative electrodes for a rechargeable lithium battery according to Examples 1 and 2 and Comparative Examples 1 to 4.

FIG. 5 is a graph showing resistance characteristics of the negative electrodes for a rechargeable lithium battery according to Examples 1 and 2 and Comparative Examples 1 to 4.

Referring to FIG. 5, the negative electrodes of Examples 1 and 2 including a predetermined amount of a conductive material added to a negative active material in which an inorganic particle was positioned on the surface of graphite showed low electric resistance. The negative electrodes of Comparative Examples 2 and 3 using an inorganic particle but no conductive material showed high electric resistance.

Evaluation 3: Initial Voltage Profile

Figure 6:
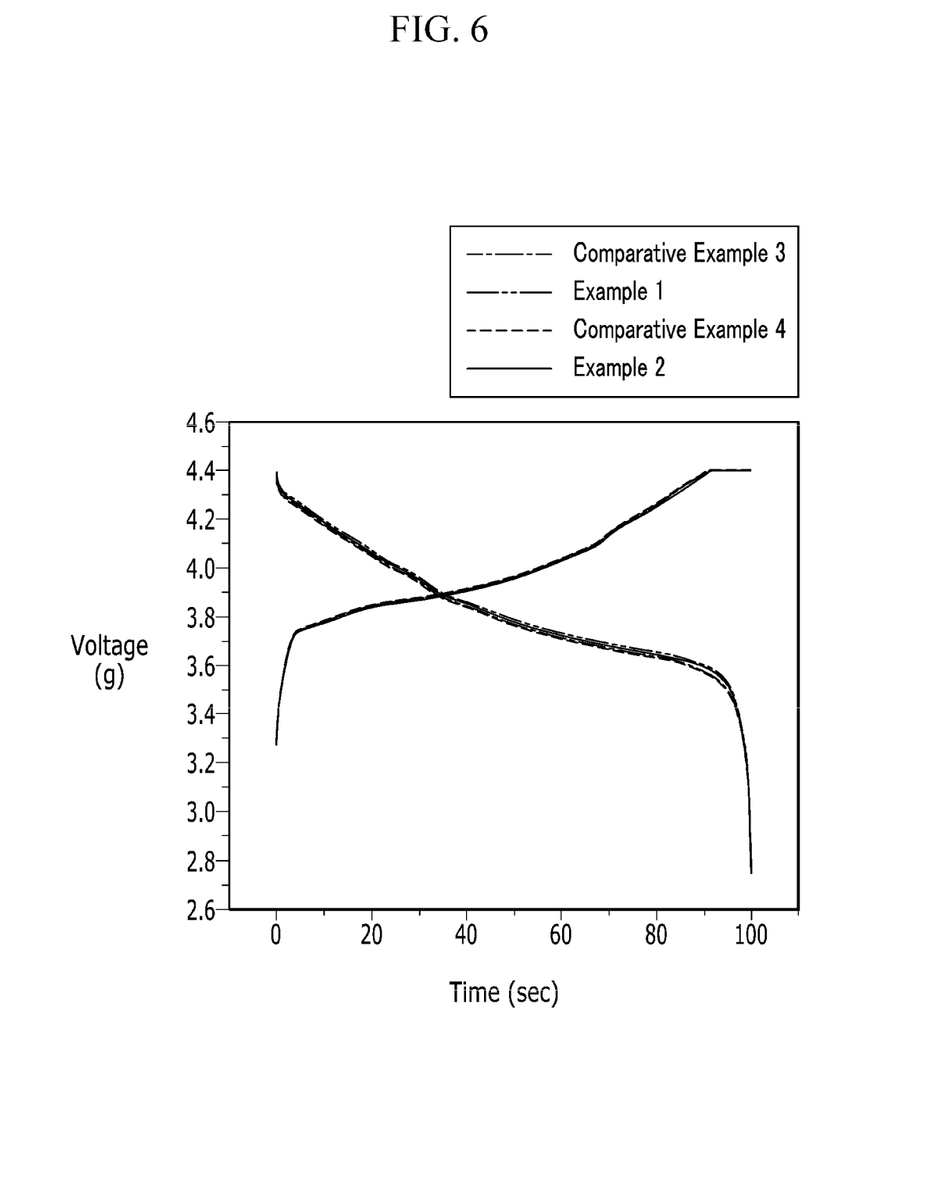
FIG. 6 is a graph showing initial voltage profiles of rechargeable lithium battery cells according to Examples 1 and 2 and Comparative Examples 3 and 4 at 0.2 C.

FIG. 6 is a graph showing initial voltage profiles of rechargeable lithium battery cells according to Examples 1 and 2 and Comparative Examples 3 and 4 at 0.2 C.

The initial voltage profiles were obtained by charging and discharging rechargeable lithium battery cells at 0.2 C of current density from 2.75 V to 4.4 V.

Referring to FIG. 6, Comparative Example 3 using no conductive material showed a little larger overvoltage compared with Examples 1 and 2 during the discharge and particularly, at the end of the discharge.

In addition, Comparative Example 4 including 2 wt % of a conductive material showed a much larger overvoltage than Examples 1 and 2. The reason is that the over-addition of a conductive material deteriorated electrolyte solution impregnation characteristics.

Evaluation 4: Rate Capability

Figure 7:
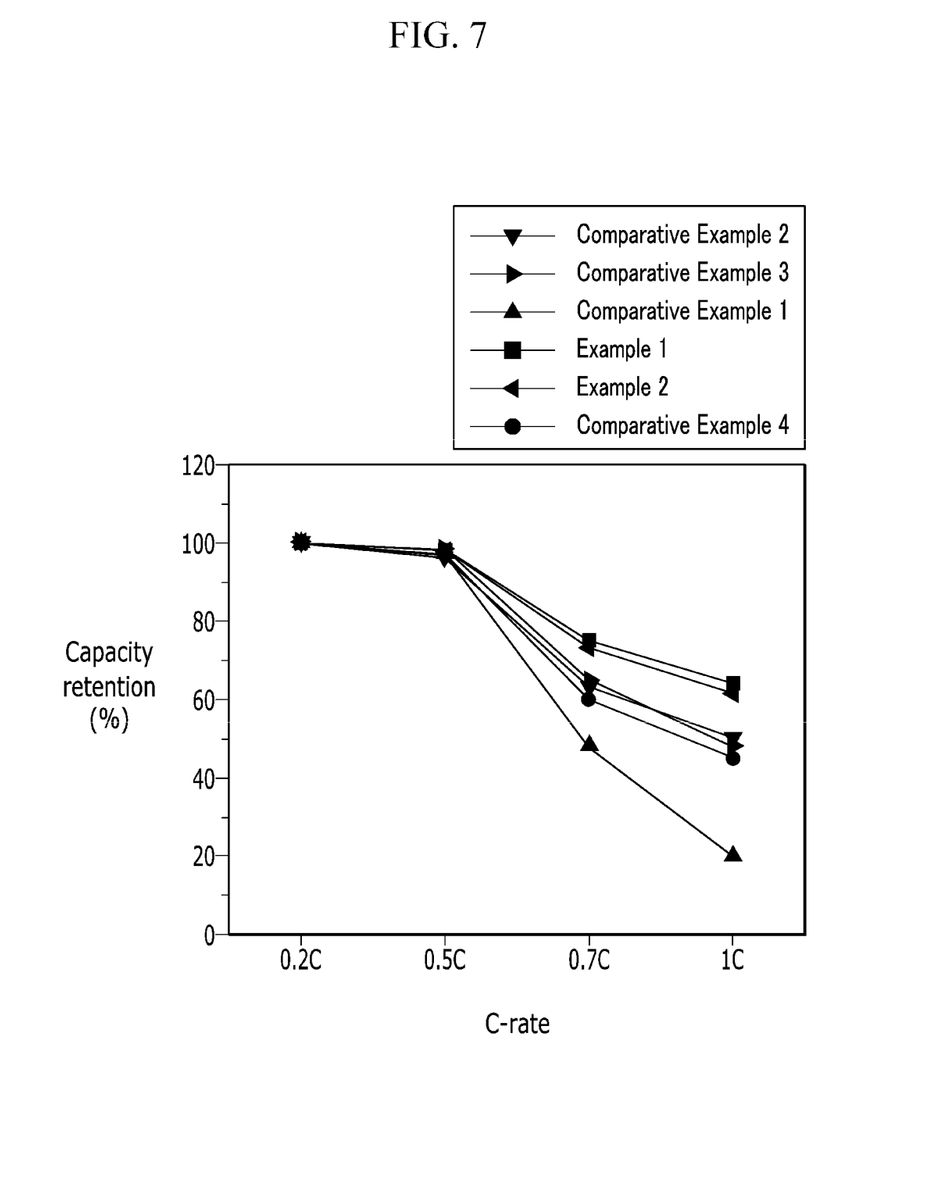
FIG. 7 is a graph showing rate capability of rechargeable lithium battery cells according to Examples 1 and 2 and Comparative Examples 1 to 4.

Rate capability of the rechargeable lithium battery cells according to Examples 1 and 2 and Comparative Examples 1 to 4 was evaluated by charging them at 0.2 C in a range of 2.75 V to 4.4 V and respectively discharging them at 0.2 C, 0.5 C, 0.7 C and 1 C and then, measuring their rate discharge characteristics, and the results are provided in FIG. 7.

FIG. 7 is a graph showing rate capability of the rechargeable lithium battery cells according to Examples 1 and 2 and Comparative Examples 1 to 4.

Referring to FIG. 7, Examples 1 and 2 using a negative active material including an inorganic particle on the surface of graphite and a conductive material in a predetermined range showed excellent rate capability compared with Comparative Examples 1 to 4. Accordingly, a negative electrode according to one embodiment showed excellent electrolyte solution impregnation property and low electric resistance and thus, may secure a rechargeable lithium battery cell having excellent rate capability.

Evaluation 5: Cycle-Life Characteristics

Figure 8:
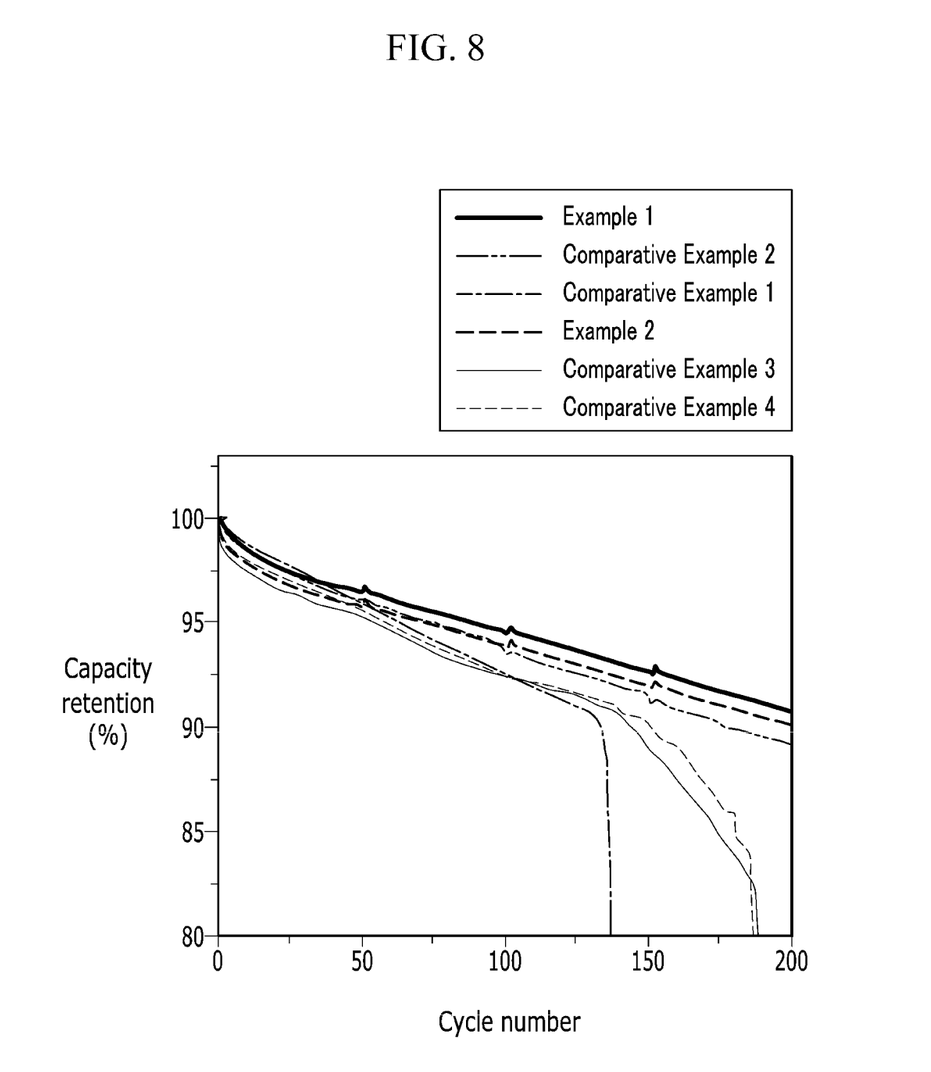
FIG. 8 is a graph showing cycle-life characteristics of the rechargeable lithium battery cells according to Examples 1 and 2 and Comparative Examples 1 to 4.

Cycle-life characteristics of the rechargeable lithium battery cells according to Example 1 and Comparative Examples 1 and 2 were measured by charging them at 1.0 C in a range of 2.8 V to 4.4 V and discharging them at 1.0 C, and the results are provided in FIG. 8.

FIG. 8 is a graph showing cycle-life characteristics of the rechargeable lithium battery cells according to Examples 1 and 2 and Comparative Examples 1 to 4.

Referring to FIG. 8, Examples 1 and 2 using a negative active material in which an inorganic particle was positioned on the surface of graphite and a conductive material within a predetermined range showed excellent cycle-life characteristics compared with Comparative Examples 1 to 4.

Accordingly, a negative electrode according to one embodiment has excellent electrolyte solution impregnation property and low electric resistance and thus, may secure a rechargeable lithium battery having excellent cycle-life characteristics.

While this disclosure has been described in connection with what is presently considered to be practical example embodiments, it is to be understood that the present embodiments are not limited to the disclosed embodiments, but, on the contrary, is intended to cover various modifications and equivalent arrangements included within the spirit and scope of the appended claims.

What is claimed is:

1. A negative electrode for a rechargeable lithium battery, comprising
a current collector and a negative active material layer formed on the current collector;
wherein the negative active material layer comprises a negative active material and a conductive material,
wherein the negative active material comprises graphite and an inorganic particle directly attached to the surface of the graphite and having no reactivity with lithium,
wherein the conductive material is included in an amount greater than or equal to about 0.1 wt % and less than about 2 wt % based on the total amount of the negative active material and the conductive material,
wherein the conductive material is a carbon-based material, a metal-based material, a conductive polymer, or a mixture thereof,
wherein the conductive material is dispersed in the negative active material layer without being present between the graphite and the inorganic particle at any surface of the graphite, and
wherein the inorganic particle is formed of a material comprising $Al_2O_3$, $Ce_2O_3$, $TiO_2$, $AlO(OH)$, $ZnO_2$, $ZrO_2$, $HfO_2$, $MnO_2$, $MgO$, $WO_2$, $V_2O_5$, or a combination thereof.

2. The negative electrode of claim 1, wherein the inorganic particle comprises a metal oxide, a metal hydrate, or a combination thereof.

3. The negative electrode of claim 1, wherein the inorganic particle is $Al_2O_3$, $AlO(OH)$ or a combination thereof.

4. The negative electrode of claim 1, wherein the inorganic particle is dry-coated on the surface of the graphite.

5. The negative electrode of claim 1, wherein the inorganic particle is on the surface of the graphite in a form of an island.

6. The negative electrode of claim 1, wherein the inorganic particle has a particle diameter of greater than or equal to about 50 nm and less than about 2 μm.

7. The negative electrode of claim 1, wherein the inorganic particle is included in an amount of about 0.2 parts by weight to about 2 parts by weight based on 100 parts by weight of the graphite.

8. The negative electrode of claim 1, wherein the negative electrode has an active mass density of greater than or equal to about 1.65 g/cc.

9. The negative electrode of claim 1, wherein the negative electrode has an active mass density of greater than or equal to about 1.70 g/cc.

10. A rechargeable lithium battery comprising a negative electrode comprising
a current collector and a negative active material layer formed on the current collector;
wherein the negative active material layer comprises a negative active material and a conductive material,
wherein the negative active material comprises graphite and an inorganic particle on the surface of the graphite and having no reactivity with lithium,
wherein the conductive material is included in an amount greater than or equal to about 0.1 wt % and less than about 2 wt % based on the total amount of the negative active material and the conductive material,
wherein the conductive material is a carbon-based material, a metal-based material, a conductive polymer, or a mixture thereof,
wherein the conductive material is dispersed in the negative active material layer without being present between the graphite and the inorganic particle at any surface of the graphite, and wherein the inorganic particle is formed of a material comprising $Al_2O_3$, $Ce_2O_3$, $TiO_2$, $AlO(OH)$, $ZnO_2$, $ZrO_2$, $HfO_2$, $MnO_2$, $MgO$, $WO_2$, $V_2O_5$, or a combination thereof.

11. The rechargeable lithium battery of claim 10, wherein the inorganic particle comprises a metal oxide, a metal hydrate, or a combination thereof.

12. The rechargeable lithium battery of claim 10, wherein the inorganic particle is $Al_2O_3$, $AlO(OH)$ or a combination thereof.

13. The rechargeable lithium battery of claim 10, wherein the inorganic particle is dry-coated on the surface of the graphite.

14. The rechargeable lithium battery of claim 10, wherein the inorganic particle is on the surface of the graphite in a form of an island.

15. The rechargeable lithium battery of claim 10, wherein the inorganic particle has a particle diameter of greater than or equal to about 50 nm and less than about 2 μm.

16. The rechargeable lithium battery of claim 10, wherein the inorganic particle is included in an amount of about 0.2 parts by weight to about 2 parts by weight based on 100 parts by weight of the graphite.

17. The rechargeable lithium battery of claim 10, wherein the negative electrode has an active mass density of greater than or equal to about 1.65 g/cc.

18. The rechargeable lithium battery of claim 10, wherein the negative electrode has an active mass density of greater than or equal to about 1.70 g/cc.

* * * * *